Oct. 22, 1957 C. O. CAREY 2,810,361
ANTI-THEFT ALARM
Filed Jan. 20, 1956
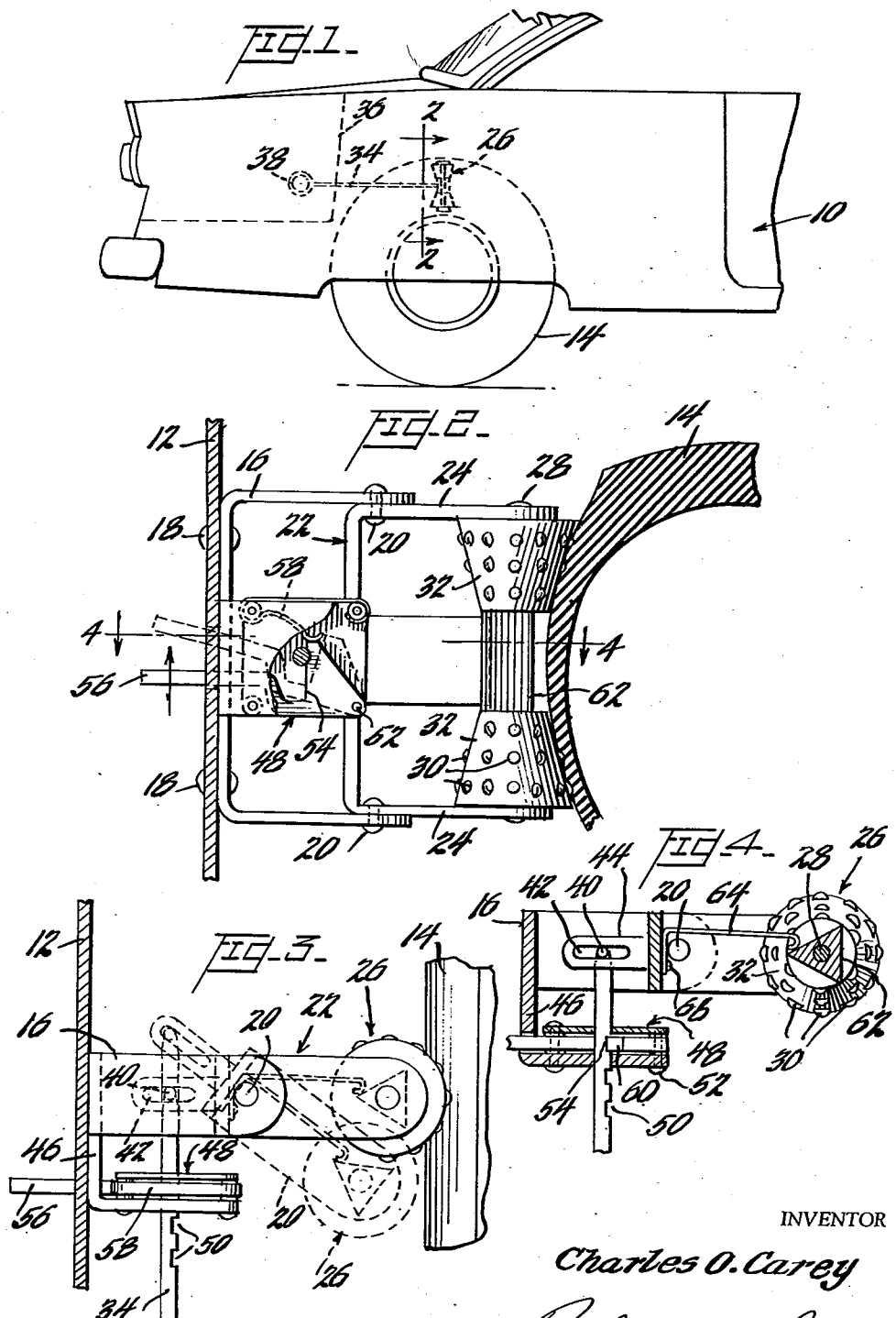
INVENTOR
Charles O. Carey
BY Parker and Walsh
ATTORNEYS 2,810,361

ANTI-THEFT ALARM

Charles Oliver Carey, Miami, Fla.

Application January 20, 1956, Serial No. 560,306

8 Claims. (Cl. 116—33)

This invention relates to an anti-theft alarm for motor vehicles.

Present day methods for locking automobiles are generally of only limited deterrent value in preventing theft of the automobiles. Numerous arrangements have been made for bypassing the locking device widely employed on automobile ignition circuits so that today, the locking device is simply regarded as a means of delaying the starting of a locked automobile. When this delay has been overcome, the automobile can be driven away without attracting any unusual attention.

Since the driving away of an automobile that is producing a loud and unusual noise is bound to attract a great deal of attention, it is obvious that an automobile equipped to produce such sound, will be unwanted by a thief and should such an automobile be stolen, the thief will immediately abandon it as soon as he discovers that the automobile is so equipped, since by driving it, he is directing unwanted attention to himself.

I have devised a simple alarm device that may be installed at small expense upon conventional automobiles, capable of producing a loud and unusual noise if the car is driven away by an unauthorized person. The device is not easily disabled even by a thief who is familiar with its method of operation. Such protection is ordinarily sufficient to the automobile owner since a thief prefers to search for another car to steal rather than risk the delay of attempting to disable a theft alarm. Thus, by its deterrent effect, my device provides a safeguard even though it cannot actually do more than to delay the theft of the automobile.

For a fuller understanding of my invention, reference should be had to the accompanying drawing wherein, Figure 1 is a skeleton view of one portion of an automobile showing how the device may be installed thereon;

Figure 2 is an enlarged elevation of an installation of the invention, viewed from the rear of the automobile, some parts being shown in section;

Figure 3 is a plan view of the apparatus as shown in Figure 2; and

Figure 4 is a section of the parts shown in Figure 3, taken along the lines 4—4 of Figure 2.

As is common on most automobiles such as that shown at 10, there is a locked rear trunk and immediately adjacent its sides, a pair of wells for the rear tires. As shown in Figures 2 and 3, a wall 12 divides the trunk from the well in which one of the wheels carrying tire 14 is housed.

At a suitable point, selected for its relative inaccessibility from the under-side of the car, a fixed U bracket 16 is secured to wall 12 by suitable fastening devices 18. On the outer arms of the bracket 16, pivot fastenings 20 enable U-bracket 22 to swing from a plane at right angles to the path of travel of the automobile to a point rearwardly thereof, as shown in Figure 3.

The spool 26 is mounted for rotation about a vertical axis on shaft 28 extending between the arms 24 of swingable bracket 22. In the active, alarm position shown in full lines of Figures 2 and 3, the bracket 22 extends outwardly in the same plane as bracket 16 so that the studs 30 on the two conical extremities of spool 26 are in frictional engagement with the side wall of tire 14. The bracket 22 is arranged to swing rearwardly far enough so that it will, in this position, permit the spool 26 to easily stand clear of the tire 14.

Movement of the swinging bracket 22 is brought about by operating lever 34 which extends rearwardly through an opening in the front wall 36 of the trunk, terminating in a handle 38. The lever 34 terminates forwardly in an upstanding pin 40, arranged to move in slot 42 of crank arm 44, extending rearwardly of bracket 22. Forward movement of the operating lever 34 causes the bracket assembly 22 to move rearwardly about pivot point 20 as shown in Figure 3.

The U-bracket 16 is provided with a side arm extension 46 extending rearwardly therefrom and upon this extension is mounted the latch mechanism 48. The lever 34 is provided with a series of notches 50 along the portion thereof extending through the latch mechanism 48. The latch member itself is pivoted at 52 and has a dogging face 54 and a handle 56, the latter extending into the trunk through a slot in wall 12. Downward movement of the handle 56 brings the dogging face 54 of the latch into engagement with one of the notches 50 while upward movement will release the operating lever 34 by taking face 54 out of engagement with notch 50. A spring keeper 58 holds the latch in whichever position it is placed by handle 56. The keeper 58 rests against keeper face 60 and in unlatched position it rests against the dogging face. A rounded end on the keeper 58 enables it to ride smoothly over the corner formed by the intersection of faces 54 and 60.

The central portion of spool 26 is provided with a small number of anvil faces 62, three as shown in the drawings. Noise making spring 64 is arranged by suitable fastening 68 on the web member of swinging U-bracket 22 so that the rounded outer portion of the spring 64 will strike the anvil faces in rapid succession as the spool 26 is rotated.

When it is desired to protect the automobile by putting the alarm into operation, the handle 38 of the operating lever 34 is pulled outwardly toward the back of the car to bring spool 26 into frictional engagement with tire 14. The latch handle may be dropped into place or it may be arranged to automatically fall when the operating handle is being pulled into alarm position. The trunk may then be locked and, if the car is then driven away by an unauthorized person, a loud and persistent noise will be made by the repeated striking of spring 64 on anvil faces 62 as the spool 26 rotates against tire 14. Fear of attracting attention will induce a thief to immediately abandon the automobile. In order for the alarm mechanism to be released, it is necessary for the trunk to be opened and the handle 56 lifted in order to release operating lever 34 thereby taking the spool 26 out of engagement with tire 14.

Although a preferred embodiment of the invention has been shown, it will be obvious that the invention is susceptible of many modifications. The operating handle 38 may be placed in a more accessible position or both the operating handle and the latch handle may be arranged within the interior of the automobile if it can be locked securely. For additional security, the latch handle and the operating handle may be arranged in separate locked enclosures so that it is relatively more difficult to release the alarm mechanism. Also, although the invention has been shown applied to the rear tire of the automobile, the parts may be rearranged so that it can be applied to some other inaccessible moving part of the automobile. I desire my invention to be limited only as stated in the appended claims.

I claim:

1. A theft alarm for motor vehicles including a frame member mounted upon the inside wall of a rear wheel well, a swingable arm mounted on the frame and including a rotatable spool provided with frictional elements for engaging the side wall of the tire located within said well, the arm being swingable to move said spool into and out of the path of rotation of said tire, a sounding device for producing an alarm sound, mounted on said arm and actuated by the rotation of the spool, a notched operating lever for moving the arm on the frame, into or out of engaging position, a pivoted latch dog for engaging the notch of the operating lever, a release arm on the dog and spring means for holding the dog firmly in either of its extreme positions, either latched or unlatched, the operating portions of both the release arm and the operating lever being located within a lockable enclosure of the motor vehicle whereby, when the alarm system has been set, it can only be deactivated by having access to the enclosure.

2. A theft alarm for motor vehicles including a frame mounted upon the inside wall of a wheel well, an arm mounted on the frame and including a spool for engaging the tire located within said well, the arm being swingable to move said spool into and out of the path of rotation of said tire, a sounding device for producing an alarm sound, mounted on said arm and actuated by the rotation of the spool, a notched operating lever for moving the arm on the frame, into or out of engaging position, a latch dog for engaging the notch of the operating lever, a release arm on the dog and spring means for holding the dog firmly in either of its extreme positions, either latched of unlatched, the operating portions of both the release arm and the operating lever being located within a lockable enclosure of the motor vehicle whereby, when the alarm system has been set, it can only be deactivated by having access to the enclosure.

3. A theft alarm for motor vehicles including a frame member mounted upon the inside wall of a rear wheel well, a swingable arm mounted on the frame and including a rotatable spool provided with frictional elements for engaging the side wall of the tire located within said well, the arm being swingable to move said spool into and out of the path of rotation of said tire, a sounding device for producing an alarm sound, mounted on said arm and actuated by the rotation of the spool, a notched operating lever for moving the arm on the frame, into or out of engaging position, a pivoted latch dog for engaging the notch of the operating lever, and a release arm on the dog, the operating portions of both the release arm and the operating lever being located within a lockable enclosure of the motor vehicle whereby, when the alarm system has been set, it can only be deactivated by having access to the enclosure.

4. A theft alarm for motor vehicles including a frame member mounted upon the inside wall of a rear wheel well, a swingable arm mounted on the frame and including a rotatable spool provided with frictional elements for engaging the tire located within said well, the arm being swingable to move said spool into and out of the path of rotation of said tire, a sounding device for producing an alarm sound, mounted on said arm and actuated by the rotation of the spool, a notched operating lever for moving the arm on the frame, into or out of engaging position, a pivoted latch dog for engaging the notch of the operating lever, and a release arm on the dog, the release arm being located within a lockable enclosure of the motor vehicle whereby, when the alarm system has been set, it can only be deactivated by having access to the enclosure.

5. A theft alarm for motor vehicles including a frame member mounted upon a relatively inaccessible portion of the vehicle, a swingable arm mounted on the frame and including a rotatable spool for engaging a portion of the vehicle that moves when the vehicle is in motion, the arm being swingable to move said spool into and out of the path of movement of said moving portion, a sounding device for producing an alarm sound, mounted on said arm and actuated by the rotation of the spool, a notched operating lever for moving the arm on the frame, into or out of engaging position, a pivoted latch dog for engaging the notch of the operating lever, and a release arm on the dog, the release arm being located within a lockable enclosure of the motor vehicle whereby, when the alarm system has been set, it can only be deactivated by having access to the enclosure.

6. A theft alarm for motor vehicles including a frame member mounted upon a relatively inaccessible portion of the vehicle, a swingable arm mounted on the frame and including a rotatable spool for engaging a portion of the vehicle that moves when the vehicle is in motion, the arm being swingable to move said spool into and out of the path of movement of said moving portion, a sounding device for producing an alarm sound, mounted on said arm and actuated by the rotation of the spool, an operating lever for moving the arm on the frame, into or out of engaging position, a pivoted latch dog for engaging a portion of the operating lever, and a release arm on the dog, the release arm being located within a lockable enclosure of the motor vehicle whereby, when the alarm system has been set, it can only be deactivated by having access to the enclosure.

7. A theft alarm for wheeled vehicles including a U-shaped frame member, the base locatable on a relatively inaccessible portion of the vehicle, a second U-shaped frame, having its base pivotally mounted in the arms of said first frame, a rotatable element rotatably mounted between the arms of said second frame, said second frame and element being swingable into resilient alarm engagement with a portion of the vehicle, rotatable when the vehicle is in motion, said frame and element being also swingable out of engagement with said vehicle portion to non-alarm position, a sounding device actuatable by said element in alarm position but inoperative in non-alarm position, an actuating member mounted on the base of said second frame for moving the frame and alarm element to active position and a latch member for automatically latching the mechanism in place upon operation of the actuating member, said latch member including a release arm, said arm being located in a lockable compartment of the vehicle.

8. The structure of claim 7 wherein the vehicle portion, engageable with the alarm element, is a vehicle tire and wherein the alarm element is shaped to conform with the engaged portion of the tire.

References Cited in the file of this patent

UNITED STATES PATENTS

| | | |
|---|---|---|
| 1,232,549 | Hoover | July 10, 1917 |
| 1,437,619 | Straub | Dec. 5, 1922 |
| 1,663,358 | Stephenson | Mar. 20, 1928 |